(12) United States Patent
Garcia et al.

(10) Patent No.: US 8,236,083 B2
(45) Date of Patent: Aug. 7, 2012

(54) WALL-FLOW HONEYCOMB FILTER HAVING HIGH STORAGE CAPACITY AND LOW BACKPRESSURE

(75) Inventors: Nicolas Garcia, Paris (FR); Maxime Moreno, St Ange le Vieil (FR); Christophe Michel Remy, Corning, NY (US)

(73) Assignee: Corning Incorporated, Corning, NY (US)

( * ) Notice: Subject to any disclaimer, the term of this patent is extended or adjusted under 35 U.S.C. 154(b) by 308 days.

(21) Appl. No.: 12/273,916

(22) Filed: Nov. 19, 2008

(65) Prior Publication Data
US 2009/0139193 A1 Jun. 4, 2009

(51) Int. Cl.
*B01D 46/00* (2006.01)
(52) U.S. Cl. .......................................... 55/523; 422/177
(58) Field of Classification Search ............ 55/522–524; 422/169–172, 177–182
See application file for complete search history.

(56) References Cited

U.S. PATENT DOCUMENTS

| | | | |
|---|---|---|---|
| 4,415,344 A | 11/1983 | Frost et al. | 55/523 |
| 4,416,676 A * | 11/1983 | Montierth | 55/523 |
| 4,417,908 A | 11/1983 | Pitcher, Jr. | 55/523 |
| 4,419,108 A | 12/1983 | Frost et al. | 55/97 |
| 4,420,316 A * | 12/1983 | Frost et al. | 55/523 |
| 4,830,749 A * | 5/1989 | Okamoto et al. | 210/323.2 |
| 5,114,581 A * | 5/1992 | Goldsmith et al. | 210/650 |
| 5,171,335 A * | 12/1992 | Kojima et al. | 55/523 |
| 6,303,368 B1 | 10/2001 | Cutler et al. | 435/297.1 |
| 6,428,755 B1 * | 8/2002 | Rao et al. | 422/180 |
| 6,508,852 B1 * | 1/2003 | Hickman et al. | 55/523 |
| 6,696,132 B2 | 2/2004 | Beall et al. | 428/116 |
| 7,306,771 B2 * | 12/2007 | Okawara | 422/177 |
| 7,556,782 B2 * | 7/2009 | Ohno et al. | 422/180 |
| 7,772,151 B2 * | 8/2010 | Li et al. | 502/339 |
| 2003/0007905 A1 * | 1/2003 | Tanaka et al. | 422/180 |
| 2004/0037754 A1 | 2/2004 | van Setten et al. | 422/177 |
| 2005/0016141 A1 | 1/2005 | Hong et al. | 55/523 |
| 2005/0042151 A1 * | 2/2005 | Alward et al. | 422/177 |
| 2005/0066639 A1 | 3/2005 | Frost | 55/523 |
| 2005/0076627 A1 | 4/2005 | Itou et al. | 55/523 |
| 2005/0159292 A1 * | 7/2005 | Pham et al. | 501/80 |
| 2005/0166562 A1 | 8/2005 | Beall et al. | 55/523 |
| 2006/0057046 A1 * | 3/2006 | Punke et al. | 423/215.5 |
| 2006/0068159 A1 | 3/2006 | Komori et al. | 428/116 |

(Continued)

FOREIGN PATENT DOCUMENTS
DE 103 30 680 7/2003
(Continued)

*Primary Examiner* — Duane Smith
*Assistant Examiner* — Amber Orlando
(74) *Attorney, Agent, or Firm* — Susan S. Wilks (57) ABSTRACT

A wall-flow honeycomb filter comprising a ceramic monolith having a plurality of porous walls formed therein. The plurality of porous walls define a plurality of inlet cells and a plurality of outlet cells extending between an inlet end face and an outlet end face of the monolith. The inlet cells are open at the inlet end face and plugged at or near the outlet end face. The outlet cells are open at the outlet end face and plugged at or near the inlet end face. The monolith has a ratio of a combined cross-sectional area of the inlet cells to a combined cross-sectional area of the outlet cells greater than 1. The monolith has at least one inlet cell cluster which contains an N×M group of inlet cells, N and M being integers greater than 1, each inlet cell cluster consisting of a plurality of inlet cells separated by inlet cluster walls.

15 Claims, 6 Drawing Sheets

U.S. PATENT DOCUMENTS

2006/0188416 A1\* 8/2006 Alward et al. .............. 422/180
2007/0110650 A1\* 5/2007 Pfeifer et al. ............. 423/213.5
2007/0116870 A1\* 5/2007 Dettling et al. ............ 427/230
2008/0124517 A1   5/2008 Beall et al. ................ 428/118

FOREIGN PATENT DOCUMENTS

| | | |
|---|---|---|
| JP | 2005-220848 | 8/2005 |
| WO | 02/10562 | 2/2002 |
| WO | 2006/024792 | 3/2006 |

\* cited by examiner

□ Standard design, 200/12
△ New design, 200/12

WALL-FLOW HONEYCOMB FILTER HAVING HIGH STORAGE CAPACITY AND LOW BACKPRESSURE

CROSS REFERENCE TO RELATED APPLICATION

This Application claims the benefit of European Application Serial No. 07301601 filed Nov. 29, 2007 and entitled "Wall-Flow Honeycomb Filter Having High Storage Capacity and Low Backpressure".

FIELD

The invention relates to wall-flow honeycomb filters such as used for particulate filtration in diesel exhaust systems.

BACKGROUND

A typical wall-flow honeycomb filter includes a monolith having longitudinal, generally parallel cells (or channels) defined by porous walls. The cells are alternately end-plugged to form a checkered pattern of plugs at the inlet and outlet end faces of the monolith. The cells having their ends plugged at the inlet end face of the monolith and open at the outlet end face of the monolith are referred to as outlet cells, and the cells having their ends plugged at an outlet end face of the monolith and open at an inlet end face of the monolith are referred to as inlet cells. In a standard cell configuration, the ratio of open cells to plugged cells at either of the end faces of the monolith is typically 1. The inlet and outlet cells typically have a square shape, perhaps because square cells are easier to manufacture and lend themselves to a regular pattern of alternating inlet and outlet cells having equal cross-sectional areas for low pressure drop and backpressure. In operation, exhaust gas or other particulate-laden flow enters the wall-flow honeycomb filter through the inlet cells, is forced from the inlet cells into the outlet cells through adjoining porous walls, and exits the filter through the outlet cells, with the porous walls retaining a portion of the particulates in the flow.

The filter may be catalyzed to reduce pollutants such as hydrocarbons and CO from the flow prior to the flow exiting the filter. The filter may be catalyzed by coating the porous walls with a washcoat containing active catalytic species and/or depositing the washcoat within the pores of the porous walls. In comparison to a bare filter, the effective flow area of the inlet cells may decrease as the thickness of the washcoat on the porous walls increases. A decrease in effective flow area could result in an increase in pressure drop across the honeycomb filter and a corresponding increase in system backpressure. If the washcoat is deposited within the pores of the porous walls, the effective flow area of the inlet cells may be largely unaffected. However, as the catalyst loading within the pores increases, the storage capacity of the filter may decrease because the pores that would otherwise be available for collecting particulates may now be filled partially or entirely with the washcoat.

SUMMARY

In one aspect, a wall-flow honeycomb filter comprises: a ceramic monolith having a plurality of porous walls formed therein, the plurality of porous walls defining a plurality of inlet cells and a plurality of outlet cells extending between an inlet end face and an outlet end face of the monolith, the inlet cells being open at the inlet end face and plugged at or near the outlet end face, the outlet cells being open at the outlet end face and plugged at or near the inlet end face. The monolith has a ratio of a combined cross-sectional area of the inlet cells to a combined cross-sectional area of the outlet cells greater than 1. The monolith has at least one inlet cell cluster which contains an N×M group of inlet cells, N and M being integers greater than 1. Each inlet cell cluster consists of a plurality of the inlet cells separated by inlet cluster walls.

In another aspect, each inlet cell cluster may be bordered by outlet cells.

In another aspect, a method of making a wall-flow honeycomb filter comprises providing a wall-flow honeycomb filter as described above and applying a washcoat comprising active catalytic species to at least a portion of the porous walls. In an aspect, a first washcoat may be applied to inlet cluster walls, and a second washcoat may be applied to porous walls which are not inlet cluster walls. The first washcoat and the second washcoat may not be the same.

In another aspect, a wall-flow honeycomb filter comprises: a ceramic monolith having a plurality of porous walls formed therein, the plurality of porous walls defining a plurality of inlet cells and a plurality of outlet cells extending between an inlet end face and an outlet end face of the monolith, the inlet cells being open at the inlet end face and plugged at or near the outlet end face, the outlet cells being open at the outlet end face and plugged at or near the inlet end face. The monolith has a ratio of a combined cross-sectional area of the inlet cells to a combined cross-sectional area of the outlet cells greater than 1. The monolith has at least one inlet cell cluster which contains an N×M group of inlet cells, N and M being integers greater than 1. Each inlet cell cluster consists of a plurality of the inlet cells separated by inlet cluster walls. The monolith may also have a second inlet cell cluster having at least one K×J array of inlet cells defined therein, K and J being integers greater than 1. Each second cluster consists of a plurality of inlet cells held together by a portion of the porous walls.

In yet another aspect, a method of making a wall-flow honeycomb filter comprises providing a wall-flow honeycomb filter as described above and applying a washcoat comprising active catalytic species to at least a portion of the porous walls, wherein the at least a portion of the porous walls is within the first and/or second clusters.

In embodiments, other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

Honeycomb wall-flow filters may provide two mechanisms for cleaning exhaust gasses. These mechanisms are (1) filtration and (2) catalysis. Filtration of soot, ash and other particulate pollutants from a gas exhaust stream, such as a diesel gas exhaust stream is accomplished by forcing the exhaust stream to enter a filter through an inlet cell which is open at an inlet face of a filter substrate, pass through a porous wall into an outlet cell which is open at an outlet face of the filter substrate. As the exhaust gas stream passes through the filter wall, particulate matter is trapped in or on the porous walls and does not pass out through the outlet of the filter. Catalysis is accomplished by flowing the exhaust gas stream past catalytic chemicals that have been imbedded in or on the surface of the walls of the filter channels. These catalytic chemicals remove toxic elements from the exhaust gas stream, such as hydrocarbons, carbon monoxide and NOx. It would be an advancement in the art to provide a filter that allows a relatively high catalyst loading balanced with a relatively high particulate storage capacity and relatively low backpressure.

Figure 1:
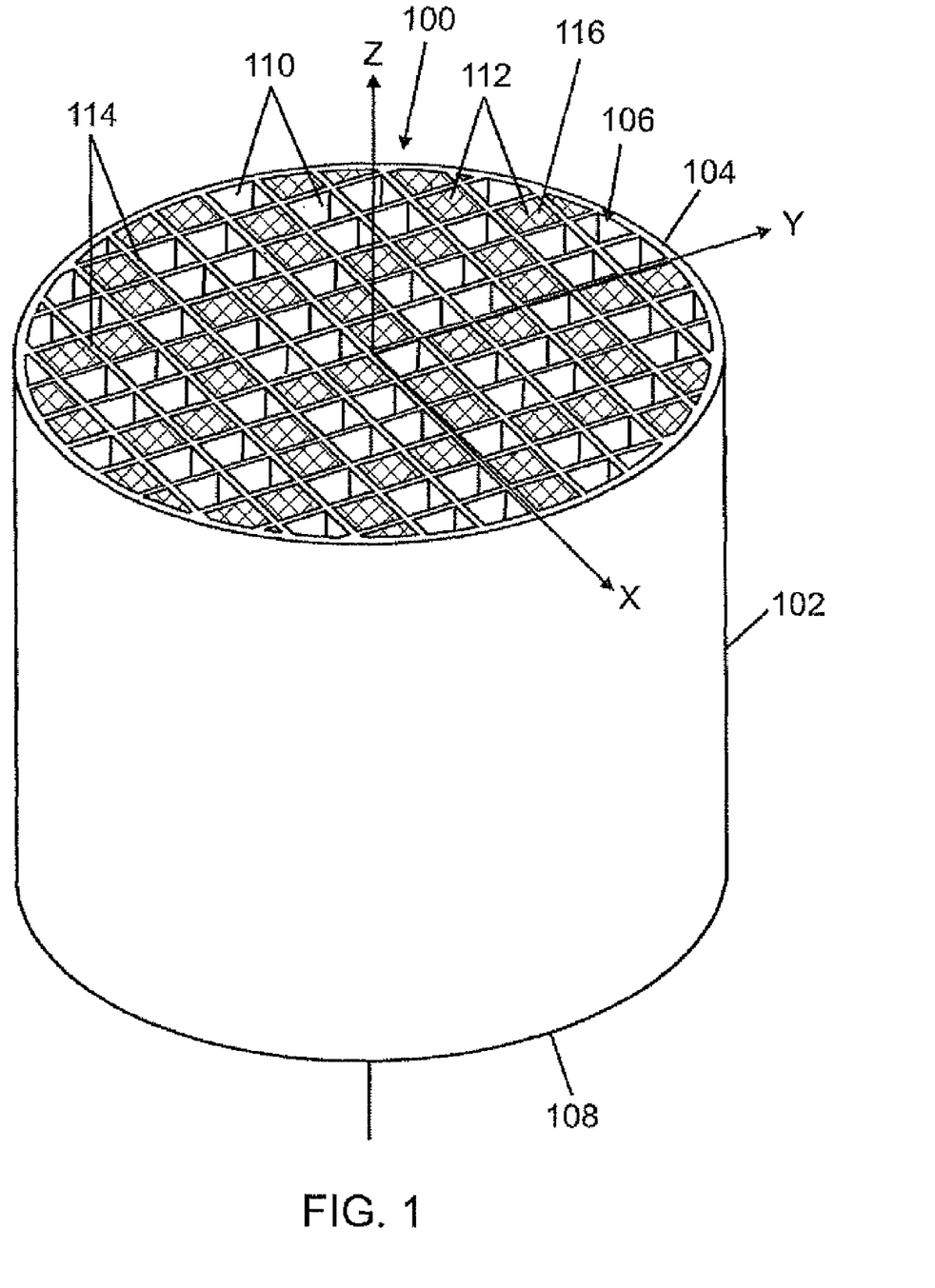
FIG. 1 is a perspective view of a wall-flow honeycomb filter according to one embodiment of the invention, taken from the inlet end of the filter.
Figure 2:
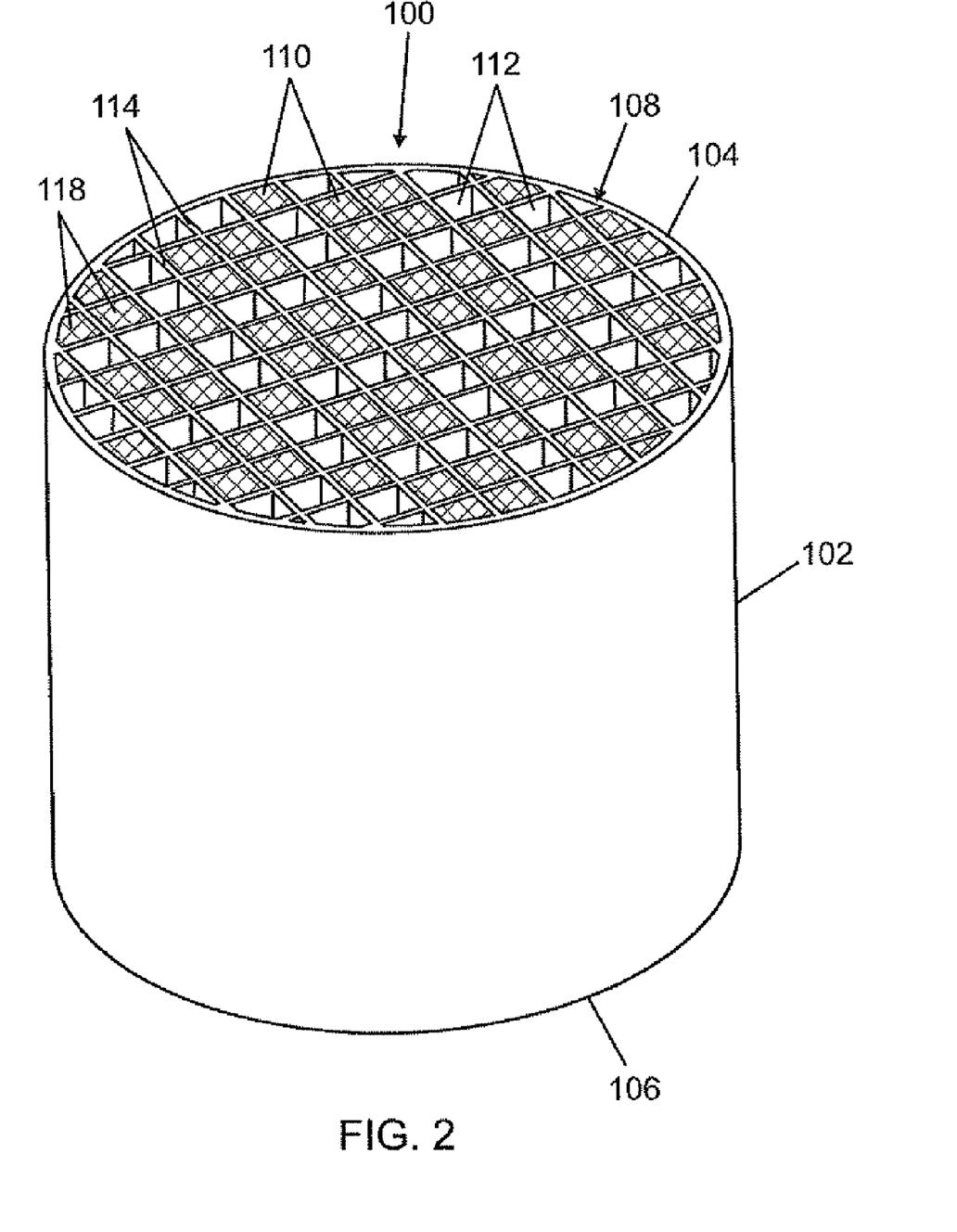
FIG. 2 is a perspective view of a wall-flow honeycomb filter according to one embodiment of the invention, taken from the outlet end of the filter.

FIGS. 1 and 2 are perspective views of a wall-flow honeycomb filter 100 that allows a relatively high catalyst loading balanced with relatively high particulate storage capacity and relatively low backpressure or pressure drop. FIG. 1 shows the wall-flow honeycomb filter 100 from the inlet end of the filter, and FIG. 2 shows the wall-flow honeycomb filter 100 from the outlet end of the filter. The backpressure of the filter 100 is relatively low for a predetermined operational period of the filter, after which regeneration of the filter may be needed. The wall-flow honeycomb filter 100 may be used bare or catalyzed. The wall-flow honeycomb filter 100 includes a monolith 102, which may be made of a ceramic material, such as cordierite, silicon carbide, aluminum titanate, mullite or other suitable materials that can withstand high temperatures, such as those encountered during thermal regeneration of a filter. The monolith 102 has a skin 104. The cross-sectional profile of the skin 104 is typically a circle or an ellipse, but the filter 100 is not limited to a monolith 102 having a circular or elliptical cross-sectional shape. The monolith 102 has an inlet end face 106 and an outlet end face 108 (shown more clearly in FIG. 2), where the end faces 106, 108 are in opposing relation.

The monolith 102 contains a plurality of longitudinal, generally parallel inlet cells 110 and a plurality of longitudinal, generally parallel outlet cells 112. An array of intersecting porous walls 114 within the monolith 102 extend from the inlet end face 106 to the outlet end face 108 of the monolith 102 along the Z-axis, also the longitudinal axis of the monolith 102. The porous walls 114 form partitions between adjacent inlet cells 110 and outlet cells 112 and between adjacent outlet cells 112. Referring to FIG. 1, the ends of the outlet cells 112 are plugged or sealed with filler material 116 at the inlet end face 106 of the monolith 102 while the ends of the inlet cells 110 are open. The filler material 116 may or may not be flush with the end face 106. Referring to FIG. 2, the ends of the outlet cells 112 are open at the outlet end face 108 of the monolith while the ends of the inlet cells 110 are plugged or sealed with filler material 118 at the outlet face 108. The filler material 118 may or may not be flush with the end face 108. The filler material, or cement or plugging material, (116 in FIG. 1, 118 in FIG. 2) may contain a ceramic material, such as cordierite, aluminum titanate, mullite, silicon carbide, and/or other materials that can withstand high temperatures, such as those encountered during thermal regeneration of the filter. Such ceramic material may be mixed with a binder and plasticizer.

In operation, particulate-laden flow, such as exhaust gas from a diesel engine, is directed at the inlet end face 106 of the monolith 102. The particulate-laden flow enters the monolith 102 through the inlet cells 110, is forced into the outlet cells 112 through the adjoining porous walls 114, and exits the outlet cells 112 at the outlet end face 108 of the monolith 102. The porous walls 114 retain a portion of the particulates in the particulate-laden flow. Typically, the higher the portion of particulates excised from the flow, the better the filtration efficiency of the filter. The structure, porosity, and thickness of the porous walls 114 are such that particulate filtration is achieved without compromising the structural integrity of the monolith 102. For diesel exhaust filtration, for example, the porous walls 114 may incorporate pores having mean diameters in the range of 1 to 60 μm, or in a range from 5 to 30 μm. The porosity of the porous walls 114 may be in a range from 30% to 80%. The thickness of the porous walls 114 may range from approximately 0.002 in. to 0.060 in. (0.05 mm to 1.5 mm). The cell density may also be selected to achieve desired filtration efficiency. In general, the filter 100 may have a cell density between approximately 10 and 400 cells/in$^2$ (1.5 and 46.5 cells/cm$^2$), or even between 100 and 300 cells/in$^2$ (15.5 and 31 cells/cm$^2$).

Figure 3:
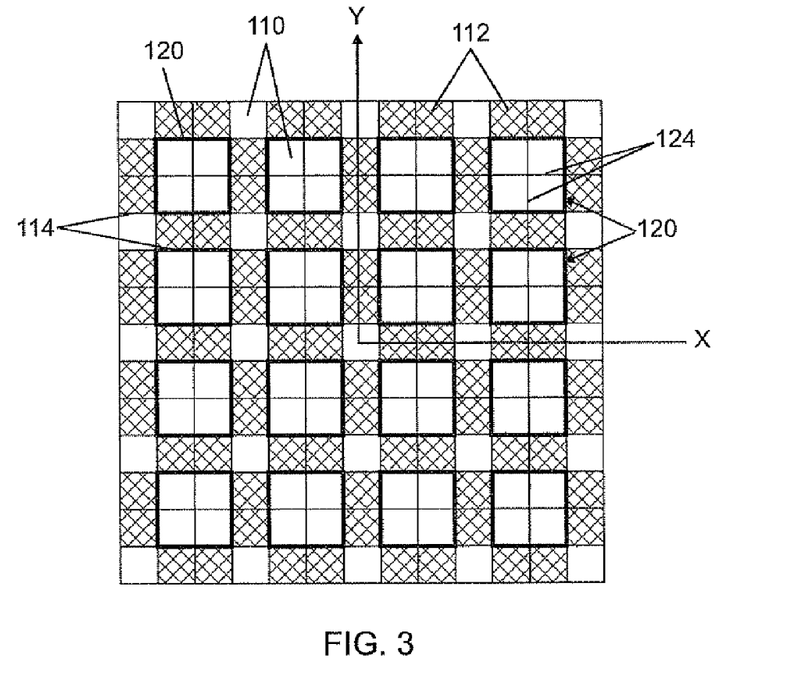
FIG. 3 is a plan view of the cell configuration used with the wall-flow honeycomb filter of FIG. 1, featuring quadrate-shaped inlet cell clusters.

FIG. 3 shows a plan view of the cell configuration used in the filter in embodiments of the present invention shown in FIGS. 1 and 2. The view shown in FIG. 3 corresponds to the inlet end face (106 in FIG. 1) of the filter (100 in FIG. 1). In this view, the ends of the inlet cells 110 are open while the ends of the outlet cells 112 are plugged or sealed. At the outlet end face of the filter the reverse is true, i.e., the ends of the inlet cells 110 are plugged or sealed while the ends of the outlet cells 112 are open, as previously described. In some embodiments of the invention, at least some of the inlet cells 110 are arranged in inlet cell clusters 120. In alternate embodiments, all of the inlet cells 110 may be arranged in clusters. For emphasis in FIG. 3, bold lines are used to demarcate the boundaries of each inlet cell cluster 120. Herein, each inlet cell cluster 120 is a group of inlet cells 110 held together in a close relationship. The inlet cell clusters 120 do not contain outlet cells 112. The inlet cells 110 are interconnected together within each cluster 120 by inlet cluster walls 124, which may or may not have the same characteristics as the porous walls 114 formed between adjoining inlet cells 110 and outlet cells 112 or between adjoining outlet cells 112. As in the case of the porous walls 114, the inlet cluster walls 124 may incorporate pores having mean diameters in the range of 1 to 60 μm and may have a porosity in a range from 30% to 80%. However, the porosity requirement of the inlet cluster walls 124 need not be the same as that of the porous walls 114 since the inlet cluster walls 124 are not required to filter particulates.

Figure 4A:
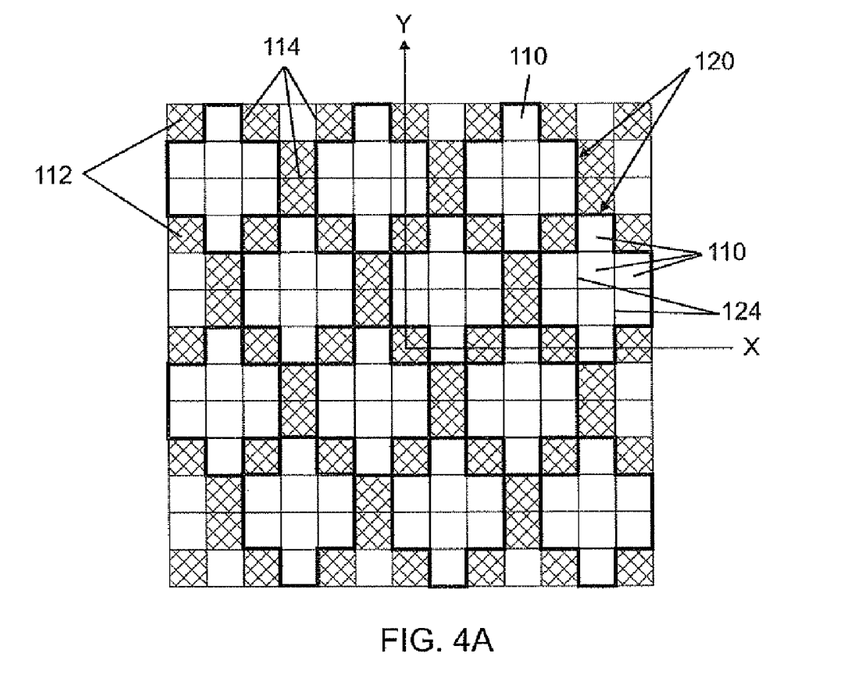
FIGS. 4A and 4B are plan views of an alternate cell configuration for use with the wall-flow honeycomb filter of FIG. 1, featuring flower-shaped inlet cell clusters.
Figure 4B:
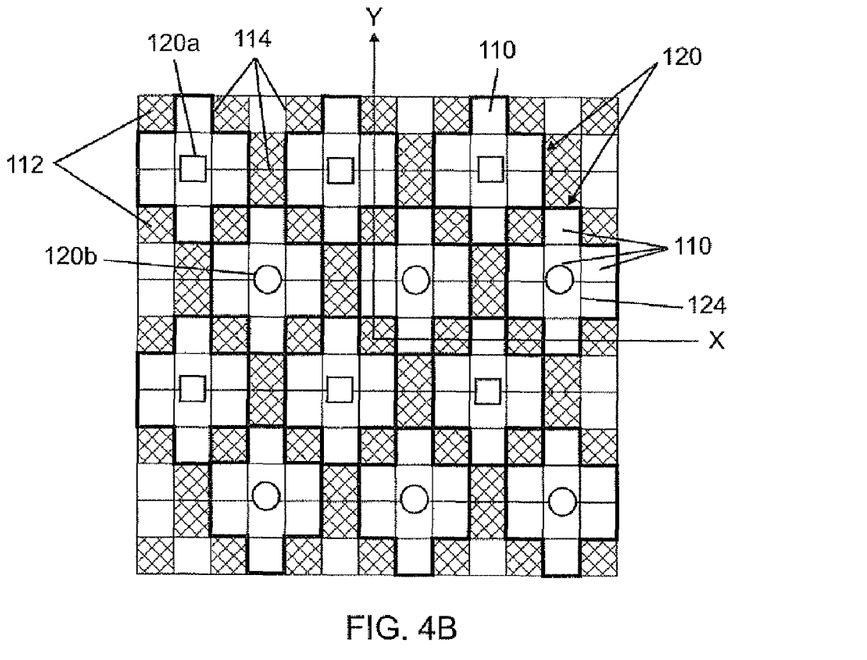
Figure 5:
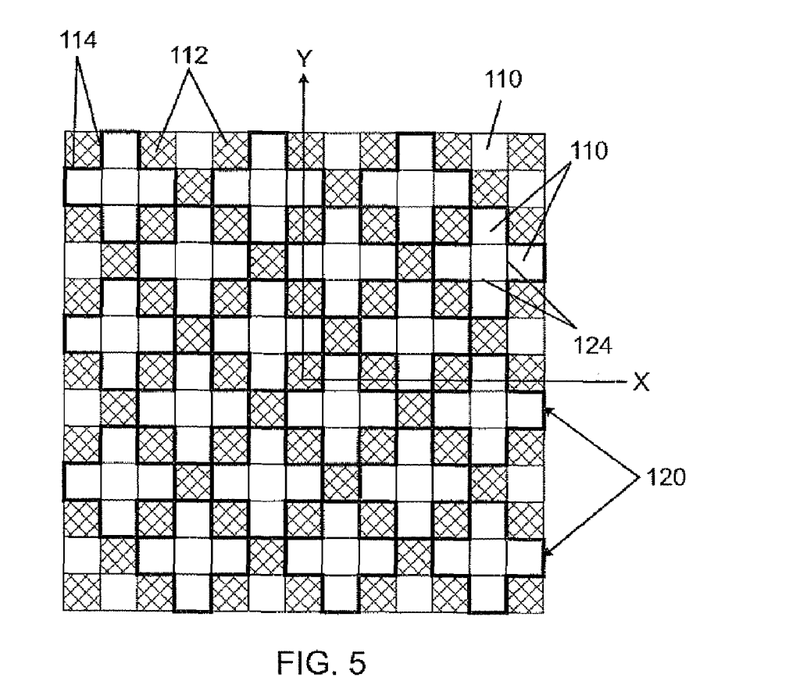
FIG. 5 is a plan view of an alternate cell configuration for use with the wall-flow honeycomb filter of FIG. 1, featuring cross-shaped inlet cell clusters.

Each inlet cell cluster 120 has a plurality of inlet cells 110 and is bordered by outlet cells 120. The shape of the inlet cell cluster 120 may be quadrate, i.e., square or rectangular, or may contain quadrate clusters, or may be non-quadrate, e.g., cross-shaped. The shape of the inlet cells 110 may be quadrate or non-quadrate. In FIGS. 3, 4A and 4B, the inlet cell cluster 120 and the inlet cells 110 may contain a quadrate shape, e.g., square. FIG. 4A shows an alternate cell configuration in which the inlet cell clusters 120 contain a quadrate shape, e.g., a flower shape, and the inlet cells 110 within each inlet cell cluster 120 have a quadrate shape, e.g., square. FIG. 5 shows another cell configuration in which the inlet cell clusters 120 have a non-quadrate shape, e.g., a cross shape, but the inlet cells 110 within each inlet cell cluster 120 have a quadrate shape, e.g., square. FIGS. 4 and 5 are what would be seen if the filter is viewed from the inlet end. At the inlet end of the filter, the inlet cells 110 are open while the outlet cells 112 are closed or sealed. When the cell configurations are viewed from the outlet end of the filter the reverse would be true. That is, the inlet cells 110 would be closed or sealed while the outlet cells 112 would be open. Other modifications can be made to the cell configuration. For example, each inlet cell cluster 120 may include inlet cells 110 with different shapes. The outlet cells 112 as well as other inlet cells 110 not within an inlet cell cluster 120 may have a quadrate or a non-quadrate shape.

In embodiments of the present invention, each cluster of inlet cells at the inlet face are separated from adjacent clusters of inlet cells by outlet cells which are plugged at the inlet face. In additional embodiments, the inlet cell clusters are separated from each other by at least one outlet cell, plugged at the inlet face. In additional embodiments, there are at least two clusters of inlet cells at the inlet face, separated by at least one plugged outlet cell, along both the X and Y axes of the inlet face.

Referring again to FIGS. 3, 4A, and 5, at least a portion of the inlet cells 110 are arranged in a plurality of inlet cell clusters 120, where each inlet cell cluster 120 is bordered by outlet cells 112. In some embodiments of the invention, each inlet cell cluster 120 has an aspect ratio less than 1.5. In one example, aspect ratio is defined as the ratio of a first dimension of the inlet cell cluster 120 measured linearly along a first axis to a second dimension of the inlet cell cluster 120 measured linearly along a second axis. The first axis and second axis are orthogonal to each other and to a longitudinal axis of the monolith (102 in FIG. 1). The first dimension is longer or equal to the second dimension and is less than 1.5 times the second dimension. In FIGS. 3, 4, 5, for example, the first axis may be the Y-axis, while the second axis may be the X-axis, where the X-axis and Y-axis are orthogonal to each other and to the longitudinal axis (Z in FIG. 1) of the monolith. The X- and Y-axes may be on a cross-sectional plane perpendicular to the longitudinal axis of the monolith (102 in FIG. 1) In some embodiments, such as illustrated in FIGS. 3 and 4, each inlet cell cluster 120 includes at least four inlet cells arranged in a 2×2 quadrate configuration. In some embodiments, such as illustrated in FIG. 5, each inlet cell cluster 120 has a cross shape.

Referring again to FIG. 3, the cell configuration includes a two-dimensional (2D) quadrate (square or rectangular) array of inlet cell clusters 120. The 2D quadrate array has N×M dimensions, where N and M are integers greater than 1. In other words, the 2D quadrate array has N columns, and each N column has M rows. Each inlet cell cluster 120 in the 2D quadrate array consists of a plurality of inlet cells 110 interconnected by porous inlet cluster walls 124.

Referring to FIG. 4A, the cell configuration includes a first 2D quadrate array of inlet cell clusters 120 and a second 2D quadrate array of inlet cell clusters 120. For illustration purposes, FIG. 4B identifies the inlet cell clusters 120 in the first 2D quadrate array by square markers 120a and the inlet cell clusters 120 in the second 2D quadrate array by circular markers 120b. The first 2D quadrate array has N×M dimensions, where N and M are integers greater than 1. In other words, the first 2D quadrate array has N columns, and each N column has M rows. The second 2D quadrate array has K×J dimensions, where K and J are integers greater than 1. In other words, the 2D quadrate array has K columns, and each K column has J rows. The second 2D quadrate array is offset from the first 2D quadrate array such that the inlet cell clusters 120 in the second 2D quadrate array are distinct from, or in a non-overlapping arrangement with, the inlet cell clusters 120 in the first 2D quadrate array. The cell configuration depicted in FIG. 5 has a similar array pattern to the one disclosed in FIGS. 4A and 4B. The cell configuration depicted in FIG. 5 can be described as a repeating pattern of inlet cells (I) and outlet cells (O) wherein the repeating array, across an inlet face of a honeycomb monolith, from left to right (or along an X axis, where the arrow indicates the X axis) is:

| O | I | O | I |
|---|---|---|---|
| I | I | I | O |
| O | I | O | I |

The repeating pattern, from top to bottom (or along the Y axis where the arrow indicates the Y axis) is:

| O | I | O |
|---|---|---|
| I | I | I |
| O | I | O |
| I | O | I |

Shown another way, the repeating pattern, as shown in FIG. 5 is:

The pattern, which can be repeated in the X and Y directions for Example 2 (FIG. 3) is:

The pattern, which can be repeated in the X and Y directions for Example 7 (FIG. 4A) is:

In embodiments of the invention, the cell configuration of the filter is such that the ratio of the combined cross-sectional area of the inlet cells 110 to the combined cross-sectional area of the outlet cells 112 is greater than 1. This definition takes into account all the inlet cells 110, including those within inlet cell clusters 120. Preferably, the ratio of the combined cross-sectional area of the inlet cells 110 to the combined cross-sectional area of the outlet cells 112 is at least 1.5. The cross-sectional area of a cell is the area of the imprint of the cell on an end face of the filter. In general, the cell configuration of the filter is also such that the combined cross-sectional area of all the inlet cells 110 within each inlet cell cluster 120 is greater than the cross-sectional area of each outlet cell 112. In cell configurations of the invention, less than 100% of the porous walls within the monolith 102 are filtering walls, the filtering walls being the porous walls 114 between adjacent inlet and outlet cells 110, 112. The porous walls or inlet cluster walls 124 within clusters 120 are considered to be non-filtering or reduced-filtering walls because they are not located between an inlet cell and an outlet cell. That is, exhaust gasses passing through the filter monolith, from an inlet face to an outlet face, do not necessarily need to pass through porous walls that occur within clusters in order to exit the monolith through an outlet channel, which is open (not plugged) at the outlet face. However, exhaust gasses must pass through a porous wall between an inlet cell and an outlet cell in order to exit the monolith through an outlet channel, which is open (not plugged) at the outlet face. Therefore, the inlet cluster walls 124 do not necessarily clean exhaust gasses by a filtration mechanism. A portion of the porous walls 114 may also be non-filtering or reduced-filtering, such as those located between adjacent outlet cells 112. These may be called outlet cell cluster walls 112.

The inlet cluster walls 124 within clusters 120, b, can provide the catalytic mechanism of cleaning exhaust gasses. These inlet cluster walls 124 within clusters 120 may provide an avenue for high catalyst loading without significantly impacting backpressure. For example, if a porous wall is required to provide both filtration and catalysis, as is the case in a traditional honeycomb filter with a checkerboard plugging pattern, the application of a catalytic layer on the porous substrate may limit the porosity of the substrate. Without being limited by the theory, the catalytic layer may fill the pores of the ceramic substrate, reducing the porosity of the material. A material with a reduced porosity will have an increased backpressure. In embodiments of the present invention, because filtration walls (between the inlet and outlet cells) and catalytic walls (within the clusters of inlet cells) are separated, and can be treated separately, this phenomenon of washcoat-plugging of the porous walls is reduced, and therefore backpressure is reduced. For a catalyzed filter 100, a washcoat containing active catalytic species is preferably coated on the inlet cluster walls 124 and/or incorporated in the pores of the inlet cluster walls 124. The washcoat may also be coated on or incorporated in the pores of the filtering porous walls 114, but generally using the inlet cluster walls 124 within the clusters 120 as the main holding substrate for active catalyst species is preferred. The washcoat may include any known active catalytic species for purifying exhaust gas, such as catalytic species for oxidizing carbon monoxide, hydrocarbons, NOx, and soluble organic fraction of particulates, as is known in the art.

In embodiments, plugging the ceramic monolith filter in the patterns illustrated in FIGS. 1-5 may also increase the capacity of the ceramic monolith to store soot and ash. Without being limited to a particular theory, as soot and ash accumulates in the filtering walls of a ceramic wall-flow filter during use, the filtering walls become caked with soot and ash, increasing backpressure over time. In embodiments of the present invention, soot and ash may be deposited onto inlet cluster walls. The accumulation of soot and ash on inlet cluster walls may have less impact on the build-up of backpressure.

In embodiments, a coating process may occur after the monolith has been plugged, so that by dipping the filter into a slurry containing washcoat from the inlet side, only the inlet cells will be coated, and by dipping the filter into a slurry containing washcoat from the outlet side, only the outlet cells will be coated. In this way, it is possible to treat the inlet cluster walls, differently from the filtering walls, within outlet cells.

The inlet cluster walls 124 may be coated with a washcoat by dipping a bare plugged filter (100 in FIG. 1) into a slurry of washcoat. The filter is dipped upside down, inlet end first, into the coating slurry. Then, the filter is removed from the slurry and air is blown into the filter, from the outlet end face (108 in FIG. 1) to the inlet end face (106 in FIG. 1). The filter is then dried. If the filter is made of a ceramic material, the filter is also fired. This process of dipping, blowing, drying, and firing may be repeated several times. For example, the filter may be dipped outlet end first, into a second coating solution. The coated filter may then be blown, dried and fired as needed. This process of dipping, blowing, drying and firing may be repeated.

Using this method, the inlet cluster walls 124 or the inlet cell cluster walls 124 may have more washcoat incorporated into the walls, than filtering walls 114, or walls which are not within a cluster of inlet cells 114. For example, washcoat, which may contain catalytic compounds, may be incorporated into the inlet cluster walls using the dip-coating method described above. Filtering walls 114 may be exposed to fewer dip-coating treatments, or no dip-coating treatments to apply washcoating. As fluids such as exhaust gasses enter embodiments of filters of the present invention, the gas stream enters into an open inlet cell, containing inlet cluster walls which contain washcoat incorporated into the inlet cluster walls. As the fluid passes by the washcoat, which may contain catalytic compounds, the noxious chemicals including carbon monoxide, hydrocarbons and NOx are cleaned from the fluid via chemical catalysis. These fluids then flow through the filtering walls into outlet cells. As the fluids pass through filtering walls, particulate matter is removed from the fluid stream. Then, the fluids pass out of the filter via the open outlet cells of the filter. Because the filtering walls have been treated with washcoat or with catalytic washcoat only on the inlet-cell-side of the filtering wall, less washcoat is incorporated into the filtering walls than would be incorporated into the inlet cluster walls, which have been treated on both faces with washcoat. These filtering walls do not significantly increase backpressure, because they do not significantly interfere with the filtering flow of contaminated gasses from the inlet cells to the outlet cells of filters. Therefore, the wall-flow honeycomb filter of the present invention, when differentially treated with washcoating, in embodiments, may provide increased catalytic capacity, without increasing overall filter backpressure.

In an additional embodiment, the filtering and inlet cluster walls, or the cluster and non-cluster walls may be coated, using, for example, a vacuum process. The vacuum process involves dipping one end of the filter into a coating slurry. The slurry is pumped up the filter using a vacuum pump. Subsequently, excess slurry is removed from the filter, and the filter is dried and fired. The process of pumping slurry, removing excess slurry, drying, and firing is repeated with the other end face of the filter. The vacuum process may be repeated several times to achieve a desired catalyst loading.

A wall-flow honeycomb filter (100 in FIGS. 1 and 2) having a cell configuration as described above and in FIGS. 3, 4, and 5 allows a relatively high catalyst loading without a significant increase in backpressure and reduction in particulate storage capacity. In comparison to filters with a standard checkerboard plug pattern, the filter 100 has more open cells at the inlet end face of the monolith, less filtering walls within the monolith, and more inlet cluster walls within the monolith. In a standard checkerboard plug pattern filter, all of the walls are filtering walls. In embodiments of the filters of the present invention, there are inlet cluster walls within the inlet cell clusters. The decrease in filtering walls does not have a significant impact on backpressure when the filter is used bare or catalyzed. Particulates can deposit onto the inlet cluster walls, decreasing cake build-up on the filtering walls, and therefore lowering backpressure. In addition, the inlet cluster walls (124 in FIGS. 3, 4, and 5) within each cluster (120 in FIGS. 3, 4, and 5) can be made thinner than the filtering walls (114 in FIGS. 3, 4, and 5) to increase or maximize the effective flow area of the inlet cells 110 within the clusters 120 and further lower backpressure.

EXAMPLES

The following examples are provided for illustrative purposes only and are not intended to limit the invention as otherwise described herein. All of the measurements and examples discussed herein were made using samples that were 2 inches in diameter and 6 inches in length.

Comparative Example 1

A filter with a standard checkerboard pattern, 200/12 wall-flow honeycomb filter having square inlet and outlet cells with a cell wall thickness of 12 mil (0.30 mm), cell density of 200 cells/in$^2$ (31 cells/cm$^2$) was made. The filter had a diameter of 2 inches and a length of 6 inches. The ratio of the combined cross-sectional area of the inlet cells to the combined cross-sectional area of the outlet cells was 1. There were no clusters of inlet cells in the filter. The cross-sectional area of each inlet cell was equal to the cross-sectional area of each outlet cell. 100% of the porous walls within the filter were filtering walls. The filter was not catalyzed.

Example 2

A wall-flow honeycomb filter having a cell configuration as described in FIG. 3 was made with a cell wall thickness of 12 mil (0.30 mm) and cell density of 200 cells/in$^2$ (31 cells/cm$^2$). The filter included clusters of inlet cells. The ratio of the combined cross-sectional area of the inlet cells to the combined cross-sectional area of the outlet cells was 1.25. The cross-sectional area of each cluster was about 4 times the cross-sectional area of each outlet cell. The inlet cluster walls within each cluster had a wall thickness of 12 mil (0.30 mm). 66% of the porous walls within the filter were filtering walls. The filter was not catalyzed.

Example 3

Figure 6:
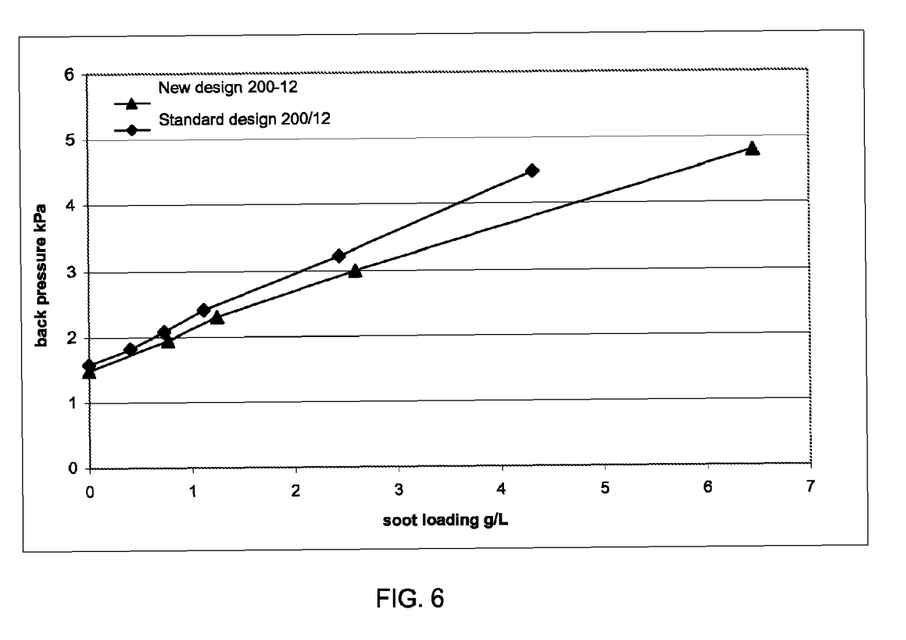
FIG. 6 is a graph comparing backpressure vs. soot loading for a standard filter and a filter having the cell configuration depicted in FIG. 3.

The wall-flow honeycomb filter of Example 1 and Example 2 were loaded with artificially generated soot. The flow rate of the soot flow was 8 ft$^3$/min. FIG. 6 shows the evolution of backpressure with increasing soot loading within the filter. As can be observed from FIG. 6, the wall-flow honeycomb filter according to Example 2 (shown by the curve marked with a triangle (Δ), having clusters of inlet cells as shown in FIG. 3, has a lower backpressure than the standard checkerboard-plugged wall-flow honeycomb filter according to Example 1, shown in FIG. 6 by the curve marked by the diamond (◊).

Comparative Example 4

The standard checkerboard-plugged wall-flow honeycomb filter of Example 1 was coated with a porous titania-based washcoat (Titania DT51D product available from Millenium Chemicals—mixed with a binder such as Nyacol™ AL20 available from Nyacol. A standard vacuum process was used to coat the filter. This included vacuum suction of the washcoat into the filtering walls several times, with drying and firing of the filter performed in between each iteration.

Example 5

The wall-flow honeycomb filter of Example 2, having clusters of inlet cells as shown in FIG. 3, was coated with a porous titania-based washcoat (Titania DT51D product available from Millenium Chemicals—mixed with a binder such as Nyacol™ AL20 available from Nyacol (note that alumina, zirconia, zeolite and the like could be used as catalyst support material). The inlet face of the filter was dipped into a slurry of the washcoat. Then air was blown from the inlet to the outlet of the filter. Then the filter was dried and fired. This process was repeated several times. This process was aimed at coating the inlet cluster walls in the interior of each cluster with the washcoat.

Example 6

Figure 7:
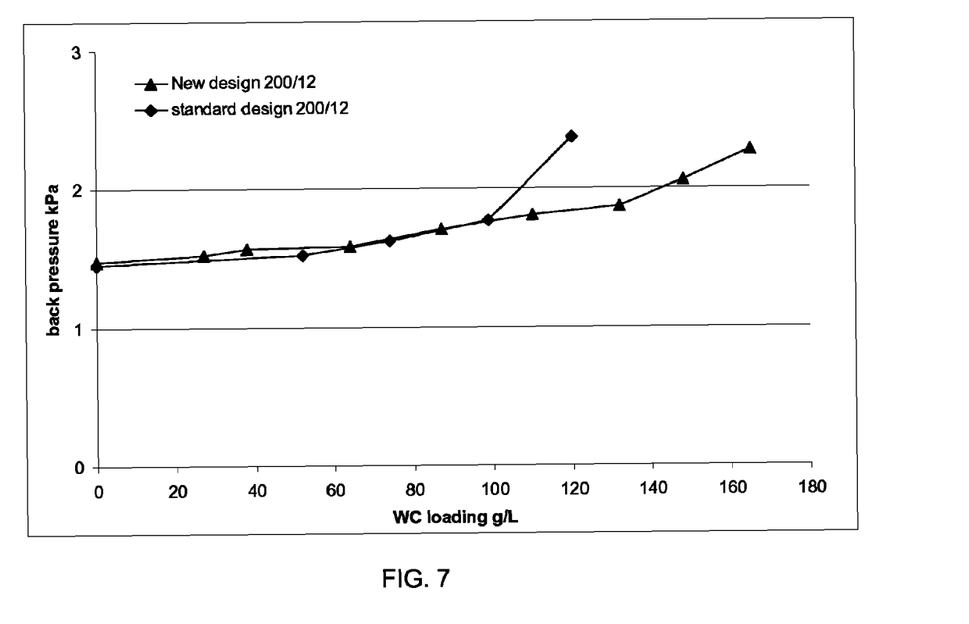
FIG. 7 is a graph comparing backpressure vs. washcoat loading for a catalyzed standard filter and a catalyzed filter having the cell configuration depicted in FIG. 3.

Backpressure was measured in the wall-flow honeycomb filters of Examples 4 and 5 with increasing washcoat loading, as described in Examples 4 and 5. FIG. 7 shows the evolution of backpressure with increasing washcoat loading within the filter. As can be seen in FIG. 7, the backpressure measured from standard design of Example 4 shown in FIG. 7 by the curve marked by the diamond (◇) increases along the same curve as the inventive design of Example 5, until a threshold of approximately 100 g/L is reached. As the standard filter is loaded above 100 g/L, the backpressure increases dramatically with increasing washcoat load. While both filters may provide adequate filtration when they are loaded with between 20 and 40 g/L of washcoat, as the washcoat loading increases to the 100 g/L range, the performance of the two filters deviates significantly. When loaded with 100 g/L of washcoat or more, the inventive design of Example 5 (shown by the curve marked with a triangle (Δ)) continues to illustrate acceptable backpressure levels. Backpressure is less affected by increasing washcoat load in the inventive design. By coating inlet cluster walls with the washcoat, more washcoat can be accommodated in the inventive design, than can be accommodated in the standard designs of Example 4.

Example 7

A wall-flow honeycomb filter having a cell configuration as described in FIG. 4A was made with a cell wall thickness of 12 mil (0.30 mm) and cell density of 200 cells/in$^2$ (31 cells/cm$^2$). The filter included clusters of inlet cells. The ratio of the combined cross-sectional area of the inlet cells to the combined cross-sectional area of the outlet cells was 2. The cross-sectional area of each cluster was about 8 times the cross-sectional area of each outlet cell. The inlet cluster walls within each cluster had a wall thickness of 12 mil (0.30 mm). 58% of the porous walls within the filter were filtering walls.

Example 8

A wall-flow honeycomb filter having a cell configuration as described in Example 5, having clusters of inlet cells as shown in FIG. 3, coated with a washcoat, was made with a cell wall thickness of 12 mil (0.30 mm) and cell density of 200 cells/in$^2$ (31 cells/cm$^2$). The filter included clusters of inlet cells. The ratio of the combined cross-sectional area of the inlet cells to the combined cross-sectional area of the outlet cells was 1.67. The cross-sectional area of each cluster was about 5 times the cross-sectional area of each outlet cell. The inlet cluster walls within each cluster had a wall thickness of 12 mil (0.30 mm). 75% of the porous walls within the filter were filtering walls. The filter was washcoated but not catalyzed.

Example 9

Figure 8:
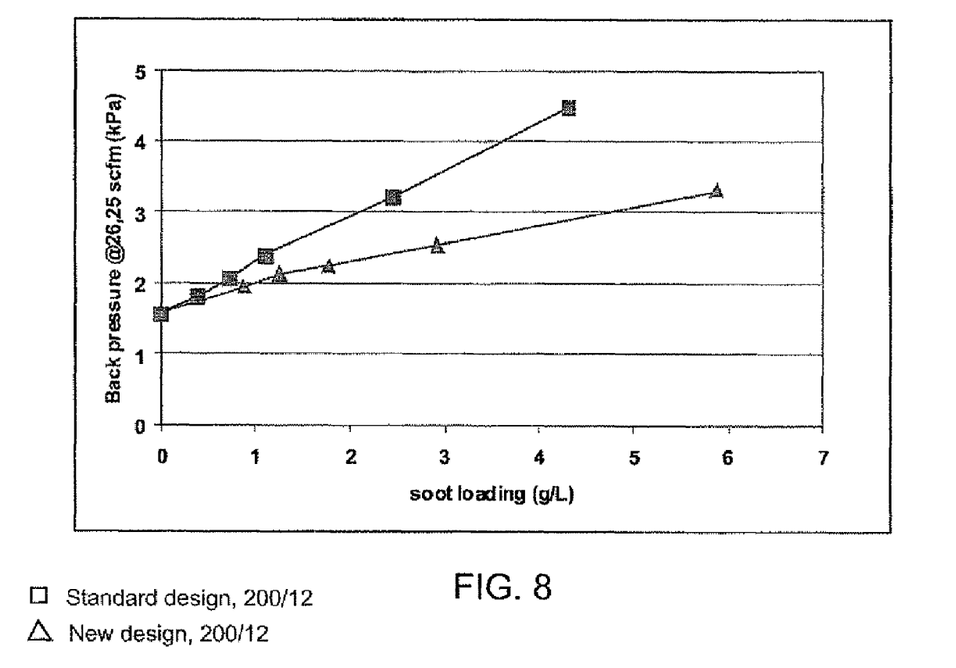
FIG. 8 is a graph comparing backpressure vs. soot loading for a standard filter and a filter having the cell configuration depicted in FIG. 5.

The wall-flow honeycomb filter of Example 1 and Example 8 were loaded with artificially generated soot at a rate of 8 ft$^3$/min. FIG. 8 shows the evolution of backpressure with increasing soot loading within the filter. As can be observed from FIG. 8, the wall-flow honeycomb filter according to Example 8 has a lower backpressure than the standard wall-flow honeycomb filter according to Example 1.

The wall-flow honeycomb filter according to the invention has a plurality of inlet cells and outlet cells. At least a portion of the inlet cells are arranged in clusters. The cell configuration is such that the combined cross-sectional area of the inlet cells is greater than the combined cross-sectional area of the outlet cells. The cell configuration is also such that less than 100% of the porous walls within the filter are filtering walls. A reduction in the filtering walls does not significantly impact backpressure. Moreover, the inlet cluster walls within clusters serve as supports for washcoat containing active catalytic species as well as provide additional surface area for deposition of particulates. Lower backpressure is achieved when the filter is loaded with particulates because of the filter's improved capacity to store particulates. The filter can be made using standard extrusion and plugging processes, with the plugging pattern modified as described for the cell configurations above. The inlet cluster walls can be catalyzed using a process such as described above. The filtering walls may also be catalyzed using standard processes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A wall-flow honeycomb filter comprising:
a ceramic monolith having a plurality of porous walls formed therein, the plurality of porous walls defining a plurality of inlet cells and a plurality of outlet cells extending between an inlet end face and an outlet end face of the monolith along a Z axis, the inlet cells being open at the inlet end face and plugged at or near the outlet end face, the outlet cells being open at the outlet end face and plugged at or near the inlet end face;
the monolith having a ratio of a combined cross-sectional area of the inlet cells to a combined cross-sectional area of the outlet cells greater than 1;
wherein inlet cells (I) and outlet cells (O) are arranged along an X and Y axis, wherein the X and Y axis are both orthoganol to the Z axis, in the following repeating pattern:

wherein the arrows indicate the X axis and the Y axis.
2. A method of making a wall-flow honeycomb filter according to claim 1, comprising:
providing a wall-flow honeycomb filter comprising a ceramic monolith having a plurality of porous walls formed therein, the plurality of porous walls defining a plurality of inlet cells and a plurality of outlet cells extending between an inlet end face and an outlet end face of the monolith, the inlet cells being open at the inlet end face and plugged at or near the outlet end face, the outlet cells being open at the outlet end face and plugged at or near the inlet end face;

the monolith having a ratio of a combined cross-sectional area of the inlet cells to a combined cross-sectional area of the outlet cells greater than 1; and, the monolith having at least one inlet cell cluster which is cross-shaped, each inlet cell cluster consisting of a plurality of inlet cells separated by inlet cluster walls, inlet cells (I) and outlet cells (O) being arranged along an X and Y axis, wherein the X and Y axis are both orthoganol to the Z-axis, in the following repeating pattern:

X ⟶

| O | I | O | I |
|---|---|---|---|
| I | I | I | O |
| O | I | O | I |
| I | O | I | I |

Y ↓ wherein the arrows indicate the X axis and the Y axis;

applying a washcoat comprising active catalytic species to at least one inlet cluster wall;

wherein the washcoat applied to at least one inlet cluster wall is different form washcoats applied to porous walls that are not within a cluster of inlet cells.

3. The method of claim 2, wherein applying a washcoat to an inlet cluster wall comprises dipping the monolith into a slurry of the washcoat comprising active catalytic species from the inlet end face of the monolith.

4. The wall-flow honeycomb filter of claim 1, wherein at least a portion of the inlet cell cluster walls is loaded with a washcoat comprising active catalytic species.

5. The wall-flow honeycomb filter of claim 4, wherein the inlet cluster walls have a higher loading of the washcoat than the cell walls external to the inlet cell clusters.

6. The wall-flow honeycomb filter of claim 4, wherein the inlet cluster walls are loaded with a different catalytic species than the cell walls external to the inlet cell clusters.

7. The wall-flow honeycomb filter of claim 4, wherein a porosity of the inlet cluster walls is different from a porosity of the cell walls external to the inlet cell clusters.

8. The wall-flow honeycomb filter of claim 1, wherein the inlet cluster walls are thinner than the cell walls external to the inlet cell clusters.

9. A wall-flow honeycomb filter comprising:

a ceramic monolith having a plurality of porous walls formed therein, the plurality of porous walls defining a plurality of inlet cells and a plurality of outlet cells extending between an inlet end face and an outlet end face of the monolith along a Z axis, the inlet cells being open at the inlet end face and plugged at or near the outlet end face, the outlet cells being open at the outlet end face and plugged at or near the inlet end face;

the monolith having a ratio of a combined cross-sectional area of the inlet cells to a combined cross-sectional area of the outlet cells greater than 1;

wherein inlet cells (I) and outlet cells (O) are arranged along an X and Y axis, wherein the X and Y axis are both orthoganol to the Z axis, in the following repeating pattern:

X ⟶

| O | I | O | I |
|---|---|---|---|
| I | I | I | O |
| I | I | I | O |
| O | I | O | I |
| I | O | I | I |
| I | O | I | I |

Y ↓ wherein the arrows indicate the X axis and the Y axis.

10. The wall-flow honeycomb filter of claim 9, wherein at least a portion of the inlet cell cluster walls is loaded with a washcoat comprising active catalytic species.

11. The wall-flow honeycomb filter of claim 10, wherein the inlet cluster walls have a higher loading of the washcoat than the cell walls external to the inlet cell clusters.

12. The wall-flow honeycomb filter of claim 10, wherein the inlet cluster walls are loaded with a different catalytic species than the cell walls external to the inlet cell clusters.

13. The wall-flow honeycomb filter of claim 10, wherein a porosity of the inlet cluster walls is different from a porosity of the cell walls external to the inlet cell clusters.

14. The wall-flow honeycomb filter of claim 9, wherein the inlet cluster walls are thinner than the cell walls external to the inlet cell clusters.

15. A method of making a wall-flow honeycomb filter according to claim 14, comprising:

providing a wall-flow honeycomb filter comprising a ceramic monolith having a plurality of porous walls formed therein, the plurality of porous walls defining a plurality of inlet cells and a plurality of outlet cells extending between an inlet end face and an outlet end face of the monolith, the inlet cells being open at the inlet end face and plugged at or near the outlet end face, the outlet cells being open at the outlet end face and plugged at or near the inlet end face;

the monolith having a ratio of a combined cross-sectional area of the inlet cells to a combined cross-sectional area of the outlet cells greater than 1; and, the monolith having at least one inlet cell cluster which is cross-shaped, each inlet cell cluster consisting of a plurality of inlet cells separated by inlet cluster walls, inlet cells (I) and outlet cells (O) being arranged along an X and Y axis, wherein the X and Y axis are both orthoganol to the Z-axis, in the following repeating pattern:

X ⟶

| O | I | O | I |
|---|---|---|---|
| I | I | I | O |
| I | I | I | O |
| O | I | O | I |
| I | O | I | I |
| I | O | I | I |

Y ↓ wherein the arrows indicate the X axis and the Y axis; and, applying a washcoat comprising active catalytic species to at least one inlet cluster wall; wherein the washcoat applied to at least one inlet cluster wall is different from washcoats applied to porous walls that are not within a cluster of inlet cells.

* * * * *